Patented July 10, 1928.

1,676,556

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS FOR THE PREPARATION OF SODIUM PHOSPHATE.

No Drawing.   Application filed December 4, 1925.   Serial No. 73,252.

This invention relates to a process for the preparation of sodium phosphate from phosphoric acid or solutions thereof containing both sulfates and silicofluoride compounds involving the separation of the sulfate, silicofluoride and other impurities in the phosphoric acid, whereby a sodium phosphate product relatively free of such impurities may be obtained.

Sodium phosphate is almost universally prepared from crude phosphoric acid obtained by treating phosphate rock with sulfuric acid. It is to be understood that there are several phosphates of sodium and that the name "sodium phosphate" is used herein generally to designate any or all of them. Such crude phosphoric acid ordinarily contains silicofluoride compounds, sulfuric acid or sulfates and iron and aluminum and associated metal compounds such as compounds of manganese chromium, nickel, copper, vanadium and similar metals including the rare earth metals, which must be removed in preparation of pure U. S. P. sodium phosphate. The sulfate content, particularly, of the sodium phosphate product must be very small. In the following description only the sulfates, the silicofluoride compounds and the iron and aluminum compounds will be referred to, it being understood that other metal compounds associated with the iron and aluminum compounds if present in the phosphoric acid treated, are precipitated with the iron and aluminum compounds.

Heretofore in the manufacture of pure sodium phosphate from crude phosphoric acid it has been customary to precipitate the sulfate content of the crude phosphoric acid in the form of barium sulfate by treating the crude acid with barium carbonate. This is quite effective but has the disadvantage that a relatively large quantity of the barium carbonate, greatly in excess of that chemically equivalent to the sulfate content of the solution, is required to accomplish the complete precipitation of the sulfate.

I have found that if the silicofluoride content of the phosphoric acid is first precipitated and the acid then treated with barium carbonate to precipitate the sulfate, the quantity of barium carbonate required is greatly reduced.

The process of my invention therefore involves mainly the treatment of phosphoric acid or a solution thereof containing both silicofluoride compounds and sulfates first with a precipitant for the silicofluoide content which is not a precipitant for the sulfates, that is, a precipitant for the silicofluoride content which is capable of forming soluble sulfates, and then with a precipitant for the sulfates.

The preparation of sodium phosphate from crude phosphoric acid or solutions also involves a neutralization of the phosphoric acid with an alkaline sodium compound such as sodium carbonate. If phosphoric acid containing sulfates and silicofluoride, iron, and aluminum compounds is treated with an alkali such as soduim carbonate, the silicofluoride content is first precipitated in the form of the corresponding alkali metal silicofluorid, followed, as more of the alkali is added, by the precipitation of iron and aluminum compounds, the phosphoric acid being simultaneously converted into the corresponding alkali metal salt.

Thus, as is described in my United States Patent No. 1,456,594, the phosphoric acid may be treated first with a quantity of an alkali metal compound such as sodium carbonate, oxid, hydroxid, bicarbonate, phosphate etc., in quantity only sufficient to precipitate the silicofluoride content of the acid, and then with a further quantity of the alkali sufficient to precipitate the iron and aluminum compounds and form the desired alkali metal phosphate.

The preferred procedure in accordance with my present invention involves a combination of the process of said patent with a step for the precipitation of sulfates, although so far as the principal feature of my present invention is concerned, the process of the patent need not be strictly followed. As indicative of the various possible procedures which may be followed, the following are mentioned. The crude phosphoric acid solution may be treated first with an alkali metal compound in quantity sufficient to precipitate the silicofluoride content without precipitating iron and aluminum compounds, then with a sulfate precipitant such as a barium compound, and then with an alkali in quantity sufficient to precipitate the iron and aluminum compounds and form the desired salt of phosphoric acid. In this procedure the several precipitates may be separately removed from the reaction mixture as they are formed, or one precipitation may follow another directly without the separate recovery of the precipitates. Or as an alternative procedure, the silicofluoride content of the phosphoric acid and the iron and aluminum compounds may be precipitated, either separately by the addition of the alkali in stages or together by the addition of sufficient alkali, followed by the precipitation of the sulfate. The only requisite in this respect, so far as my present invention is concerned, is that the silicofluoride content of the solution be precipitated before the solution is treated for the precipitation of its sulfate content. Whether or not the several precipitates, i. e. silicofluorides sulfates, and iron and aluminum compounds are separately recovered or not may depend upon such considerations as the prevailing market values of these materials.

A preferred procedure in accordance with my invention is as follows:

A crude phosphoric acid solution containing sulfate and iron, aluminum, and silicofluoride compounds and having, for instance, a concentration of about 20° Bé, such as may be obtained by treating phosphate rock with sulfuric acid, is treated with sodium carbonate (soda ash) in quantity amounting to about 30 per cent of the quantity required to transform the phosphoric acid content of the solution into mono sodium phosphate. According to my Patent No. 1,456,594, above referred to, the quantity of soda ash used in this step should not exceed three-fourths or 75 percent and preferably 50 percent of the quantity necessary to form the mono sodium phosphate, if silicofluoride is to be recovered in reasonably pure form. In the preferred procedure according to the present invention I limit the quantity of soda ash used in this step of precipitating silicofluoride not only for the purpose of minimizing or entirely avoiding the precipitation of iron and aluminum compounds with the silicofluoride but also in order to leave the solution sufficiently acid to facilitate and hasten the reaction of the barium carbonate with the sulfate content of the solution and to prevent the precipitation of barium phosphate in the subsequent step for the removal of sulfate from the solution. If such a quantity of soda ash is used that the iron and aluminum compounds are precipitated with the silicofluoride content of the solution the separate recovery of the sodium silico fluoride in pure form is of course impossible and if the acidity of the solution is too greatly reduced the action of the barium carbonate in precipitating the sulfate in the subsequent step will be retarded and besides barium phosphate may be precipitated along with the barium sulfate. The precipitation of barium phosphate should be carefully avoided not only because it gives rise to losses of both barium and phosphoric acid but also because of the incidental contamination of the barium sulfate precipitate. The slow action of barium carbonate upon a phosphoric acid solution the acidity of which has been too greatly reduced by the addition of soda ash in the silico fluoride precipitating step may be met by substituting for barium carbonate as the sulfate precipitant other compounds of barium such as the oxid or hydroxid or salts such as the chloride or nitrate but such compounds are more expensive than the carbonate and besides their use will not avoid the precipitation of barium phosphate. Since the point at which a further addition of soda ash in the precipitation of the silicofluoride content of the solution gives rise to the undesirable phenomena above referred to varies with the concentration of the acid being treated, it is impossible to specify a quantity of soda ash suitable for use under all conditions. The quantity of soda ash which should be used in any particular instance is readily determined. After the precipitation of the silicofluoride content of the crude acid as described, the precipitate is separated and the resulting purified solution is treated with barium carbonate in quantity just chemically equivalent to or preferably slightly in excess of the sulfate content of the solution. In addition to the precautions referred to above which should be observed in connection with the sulfate precipitating step, it is noted that the temperature of the solution during the sulfate precipitation should not be so high as to result in the precipitation of dibarium phosphate. The temperature of the solution during the sulfate precipitation should be kept below 150° F. and preferably down in the neighborhood of 70° to 80° F. The barium sulfate precipitate is separated and the solution is then treated with alkali in quantity sufficient to precipitate the iron and aluminum compounds and form the desired sodium salt of the phosphoric acid in accordance with known procedure. Briefly then, my preferred process is to (1) treat a crude phosphoric acid solution with a limited quantity of soda ash sufficient to precipitate the silicofluoride content thereof as sodium silico fluoride without precipitating iron or aluminum compounds or too greatly reducing the acidity of the solution, and separate the precipitate; (2) treat the resulting solution with barium carbonate in quantity sufficient to precipitate the sulfate content of the solution and separate the precipitate; and (3) treat the resulting solution with soda ash in quantity sufficient to precipitate iron and aluminum compounds and separate the precipitate. It is evident that the invention is not limited to this specific procedure or to the use of the particular reagents or the quantities thereof specified.

Possible modifications of the procedure and the quantities of reagents specified have been indicated in the foregoing description. As to the reagents specified, it is evident that various alkali metal compounds may be employed for the precipitation of the silico fluorid and for neutralizing the phosphoric acid and precipitating iron and aluminum compounds. Sodium carbonate or soda ash is preferred on account of its availability and cost, and because its use results in the production of sodium phosphate which is a desirable product. Barium carbonate is the preferred sulfate precipitating agent, but as has been stated, other barium compounds, such as the oxid and hydroxid, and in fact compounds of other metals which form insoluble sulfates, may be employed.

I claim:

1. In a process for the preparation of sodium phosphate from a solution of phosphoric acid containing a sulfate and a silicofluoride compound the steps which comprise treating the solution with a compound of a metal capable of precipitating the silicofluoride content thereof and of forming a sulfate which is soluble therein and thereafter treating the solution with a compound of a metal capable of precipitating the sulfate content thereof.

2. In a process for the preparation of sodium phosphate from a solution of phosphoric acid containing a sulfate and a silicofluoride compound the steps which comprise treating the solution with a sodium compound and thereafter treating the solution with a barium compound capable of precipitating the sulfate content of the solution.

3. In a process for the preparation of sodium phosphate from a solution of phosphoric acid containing a sulfate and a silicofluoride compound the steps which comprise treating the solution with sodium carbonate and thereafter treating the solution with barium carbonate.

4. In a process for the preparation of sodium phosphate from a solution of phosphoric acid containing a sulfate and a silicofluoride compound the steps which comprise treating the solution with a compound of an alkali metal in quantity sufficient to precipitate the silicofluoride content of the solution and thereafter treating the solution with a compound of a metal capable of precipitating the sulfate content thereof.

5. In a process for the preparation of sodium phosphate from a solution of phosphoric acid containing a sulfate and a silicofluoride compound the steps which comprise treating the solution with a compound of a metal capable of precipitating the silicofluoride content of the solution and capable of forming a sulfate of the metal which is soluble in the solution and thereafter treating the solution with a compound of barium capable of precipitating the sulfate content of the solution.

6. In a process for the preparation of sodium phosphate from a solution of phosphoric acid containing a sulfate and a silicofluoride compound the steps which comprise treating the solution with an alkaline compound of an alkali metal and thereafter treating the solution with a compound of a metal capable of precipitating the sulfate content thereof.

7. In a process for the preparation of sodium phosphate from a solution of phosphoric acid containing a sulfate, a silicofluoride compound and iron and aluminum compounds the steps which comprise treating the solution with an alkaline compound of an alkali metal in quantity sufficient to precipitate the silicofluoride content of the solution but insufficient to precipitate iron and aluminum compounds, thereafter treating the solution with a compound of a metal capable of precipitating the sulfate content thereof and thereafter treating the solution with an alkaline compound of an alkali metal in quantity sufficient to precipitate iron and aluminum compounds.

8. In a process for the preparation of sodium phosphate from a solution of phosphoric acid containing a sulfate and a silicofluoride compound the steps which comprise treating the solution with a quantity of an alkaline compound of an alkali metal in quantity amounting to about 30 percent of the quantity theoretically required to convert the phosphoric acid content of the solution into a mono alkali metal phosphate, and thereafter treating the solution with a compound of a metal capable of precipitating the sulfate content thereof.

9. Process which comprises treating a solution of phosphoric acid containing a sulfate, a silicofluorid, and iron and aluminum compounds with sodium carbonate in quantity amounting to about 30% of the quantity required to convert the phosphoric acid content of the solution into mono sodium phosphate, treating the resulting solution with barium carbonate in quantity slightly in excess of the chemical equivalent of the sulfate content of the solution at a temperature below 150° F., and treating the resulting solution with an alkali in quantity sufficient to precipitate the iron and aluminum compounds.

In testimony whereof, I affix my signature.

HENRY HOWARD.